Figure 5:
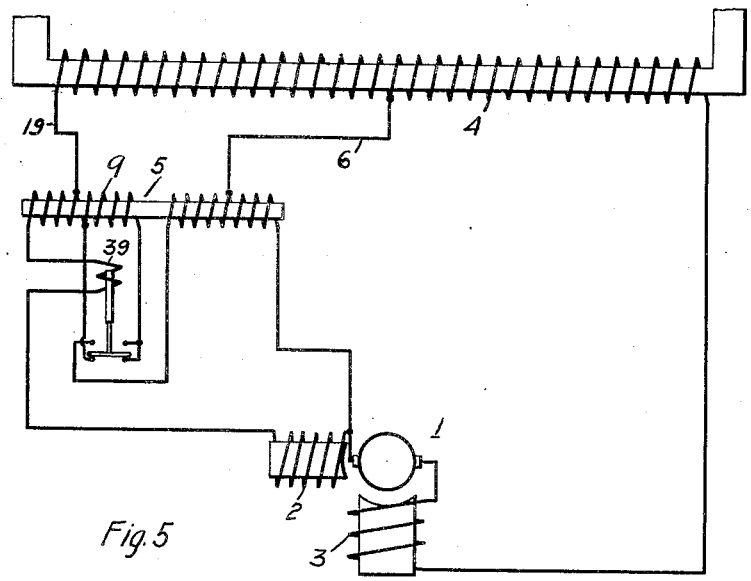

R. E. HELLMUND.
SINGLE PHASE MOTOR CONTROL SYSTEM.
APPLICATION FILED OCT. 3, 1917.

1,338,367.

Patented Apr. 27, 1920.
9 SHEETS—SHEET 1.

WITNESSES:

INVENTOR
Rudolf E. Hellmund.
BY
ATTORNEY

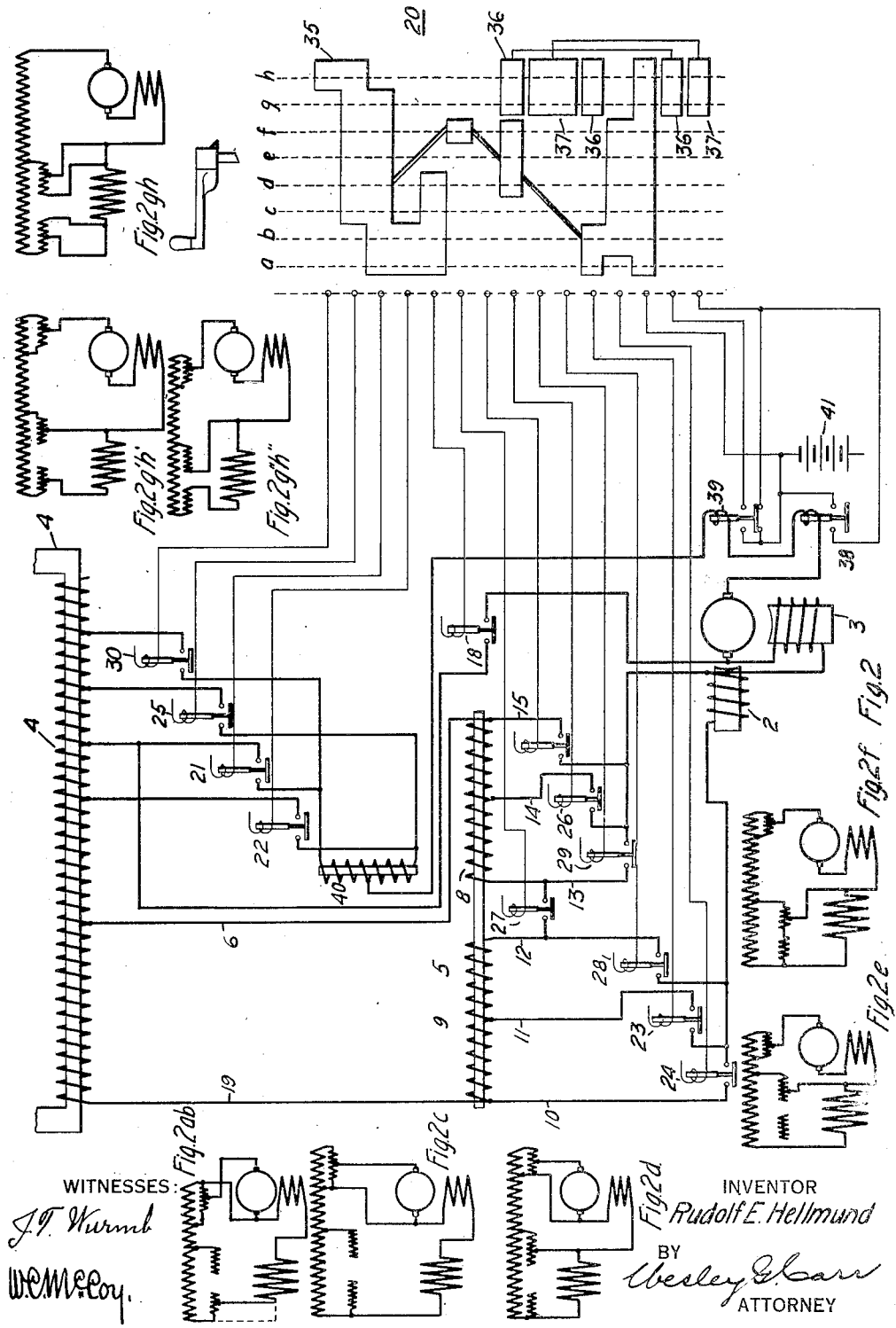

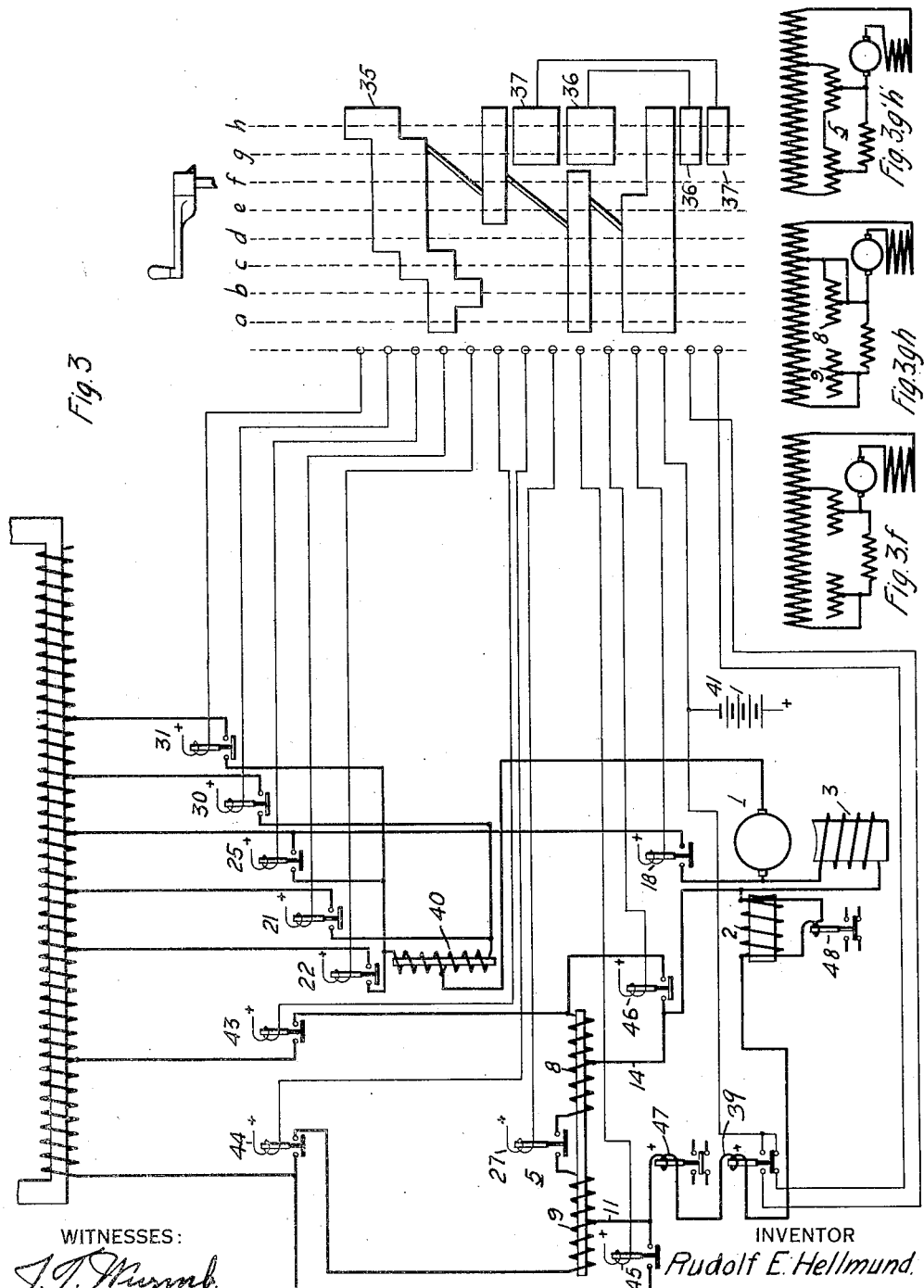

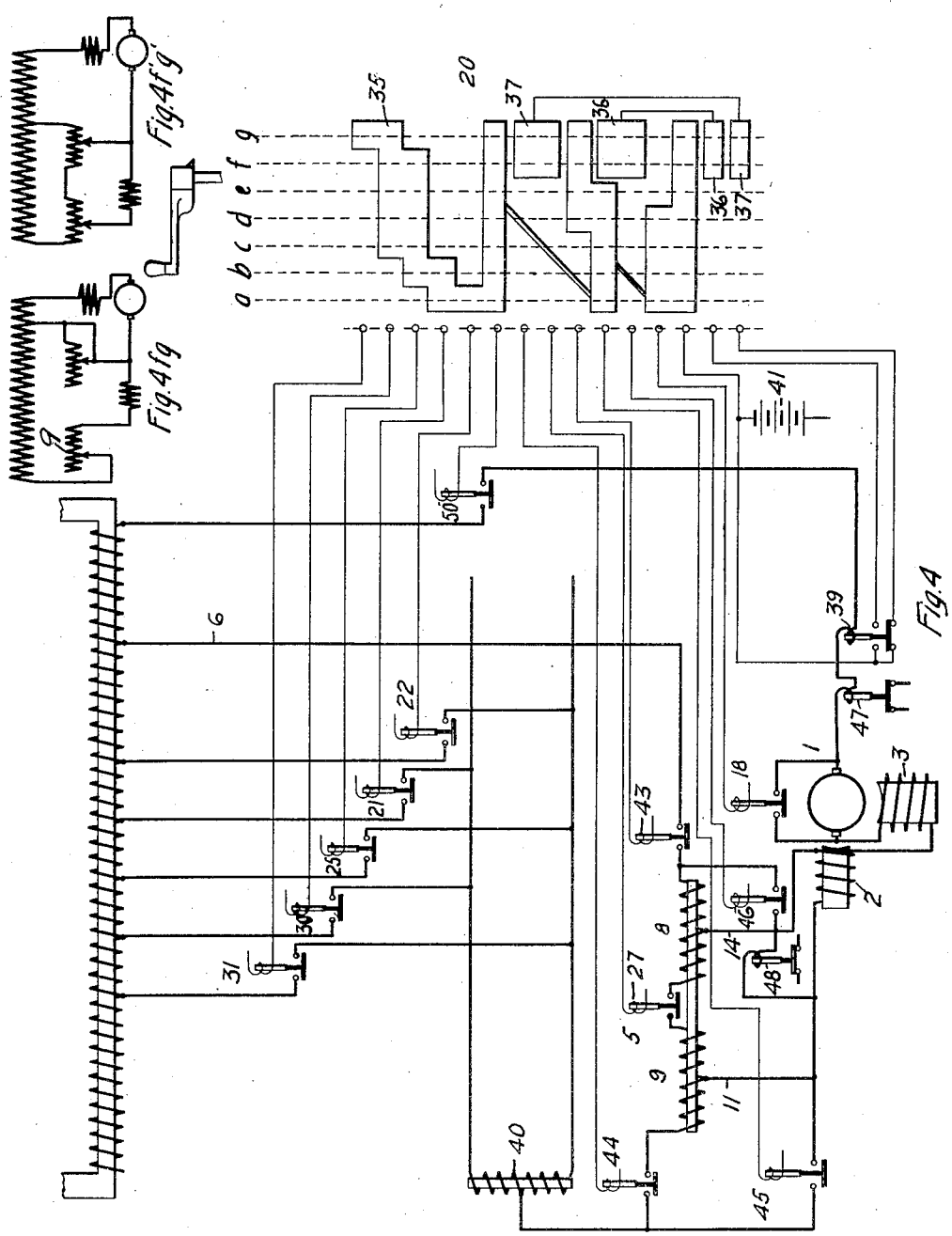

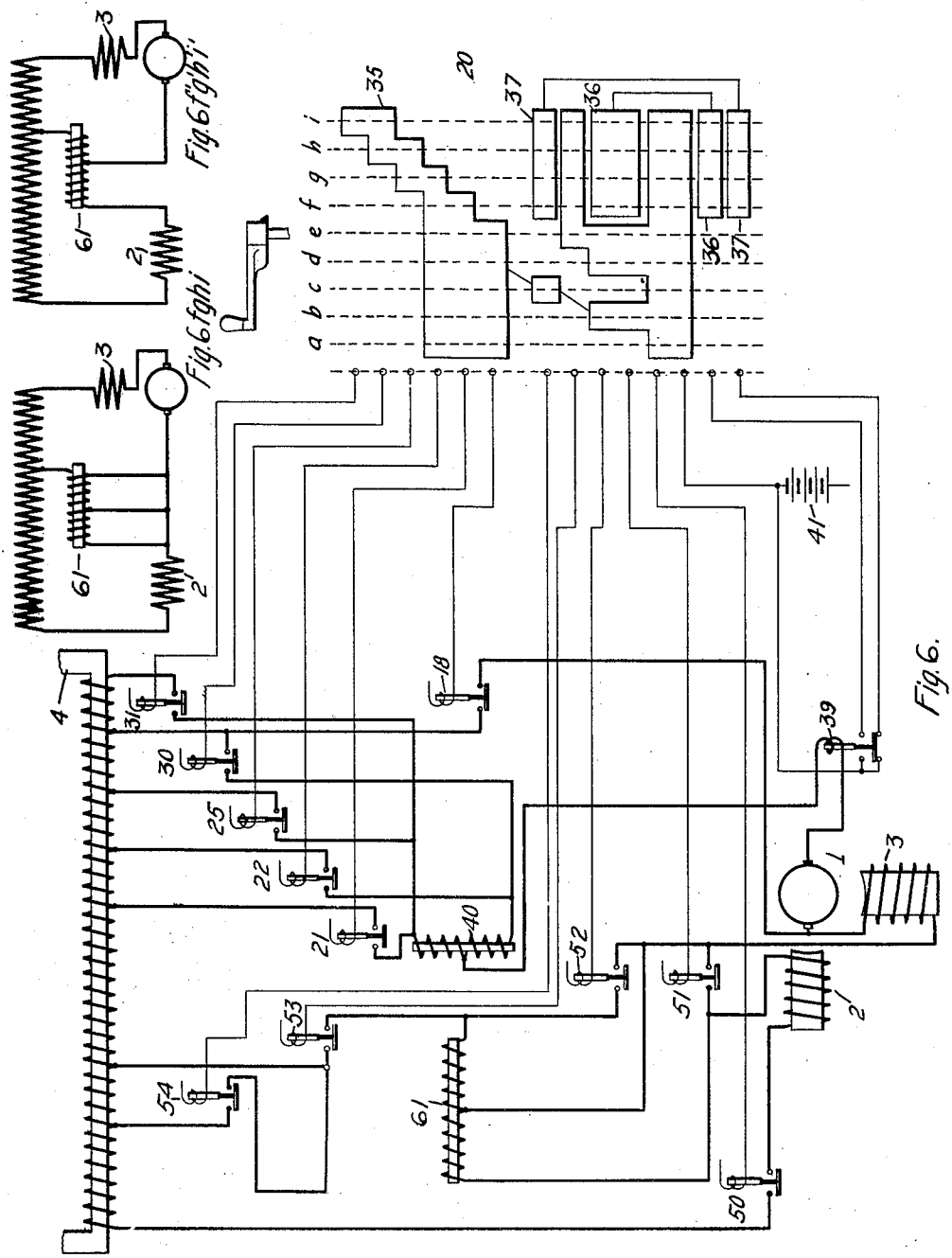

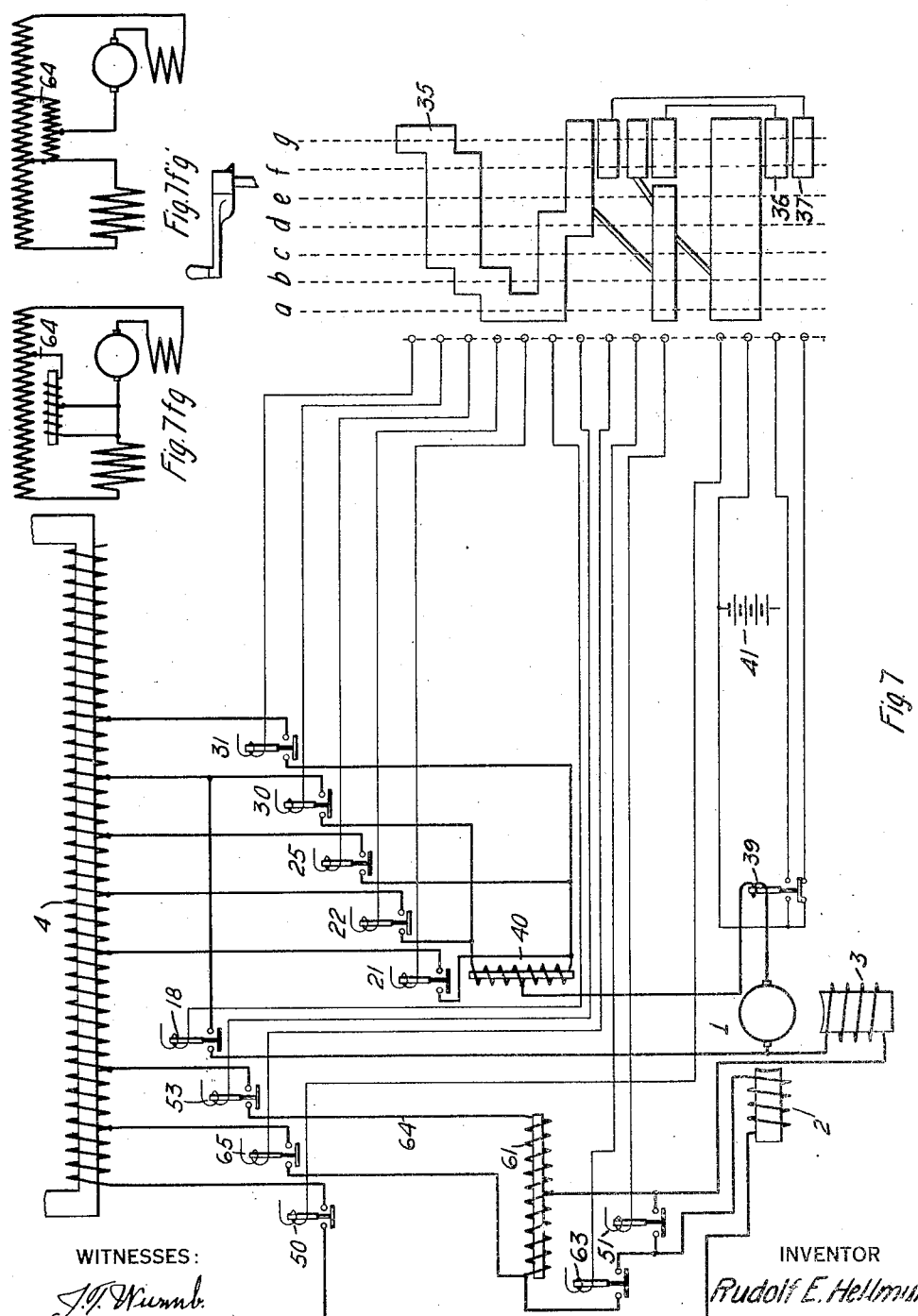

R. E. HELLMUND.
SINGLE PHASE MOTOR CONTROL SYSTEM.
APPLICATION FILED OCT. 3, 1917.
1,338,367.
Patented Apr. 27, 1920.
9 SHEETS—SHEET 7.
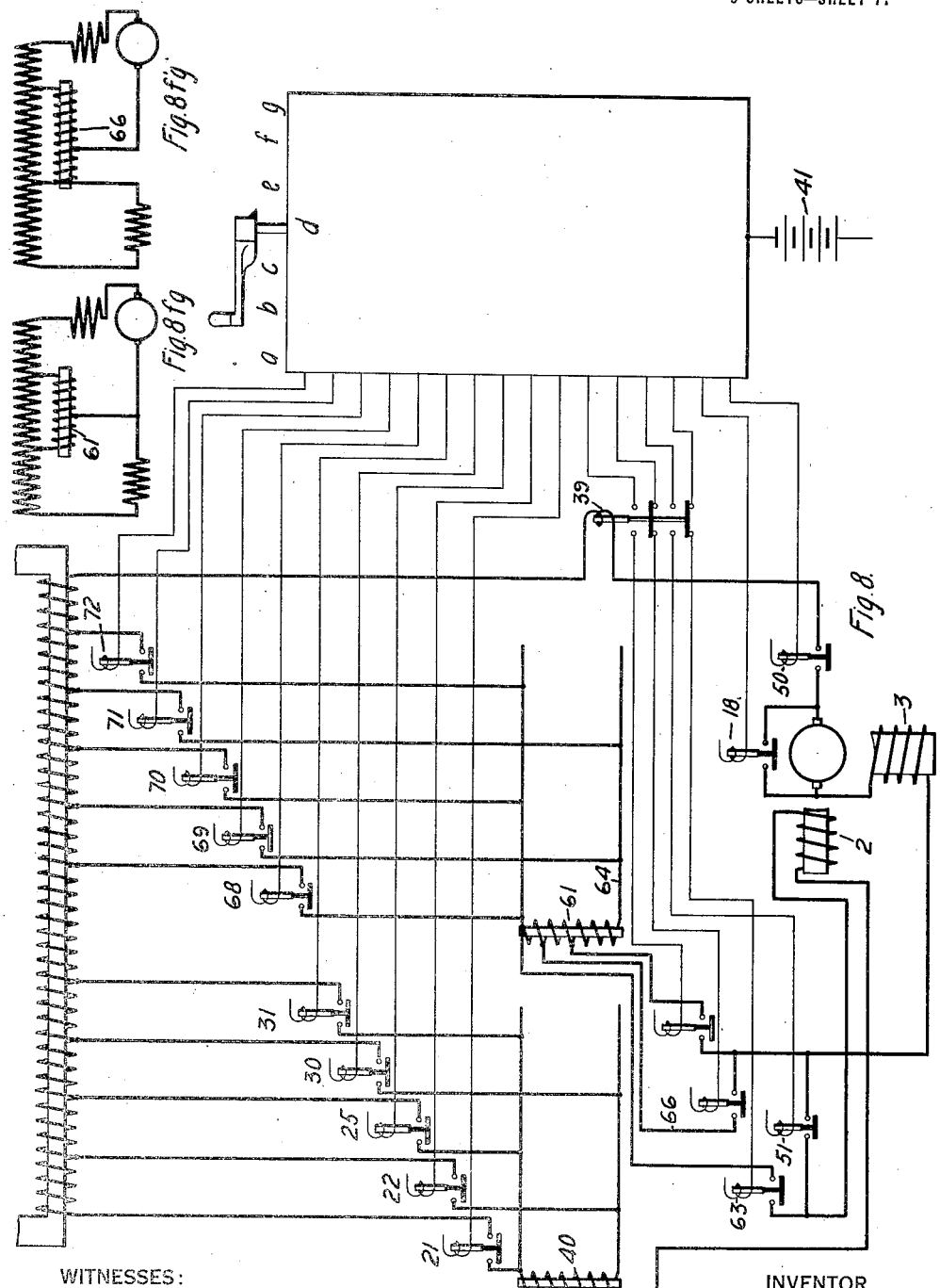
WITNESSES:
INVENTOR
Rudolf E. Hellmund.
BY
ATTORNEY

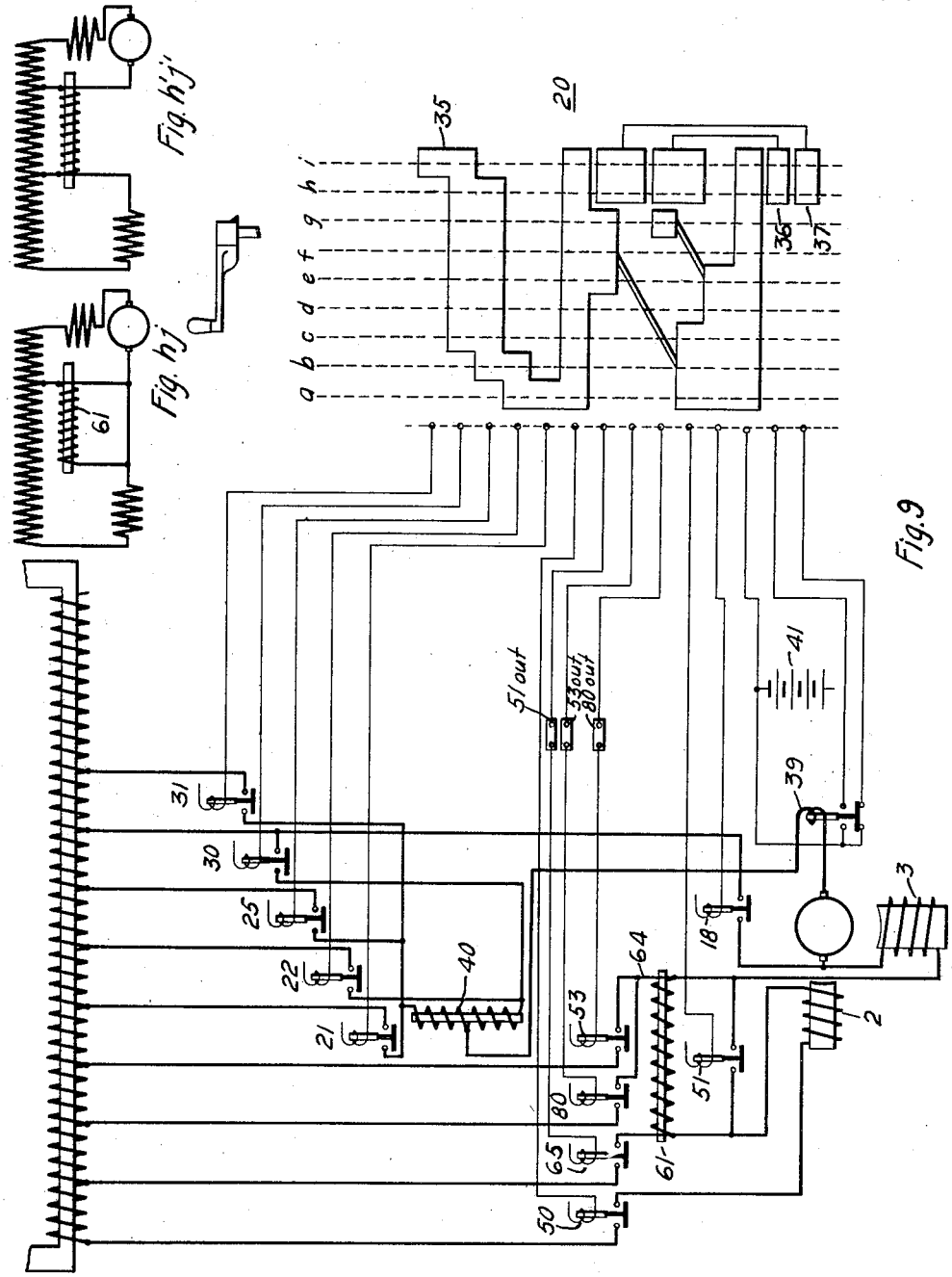

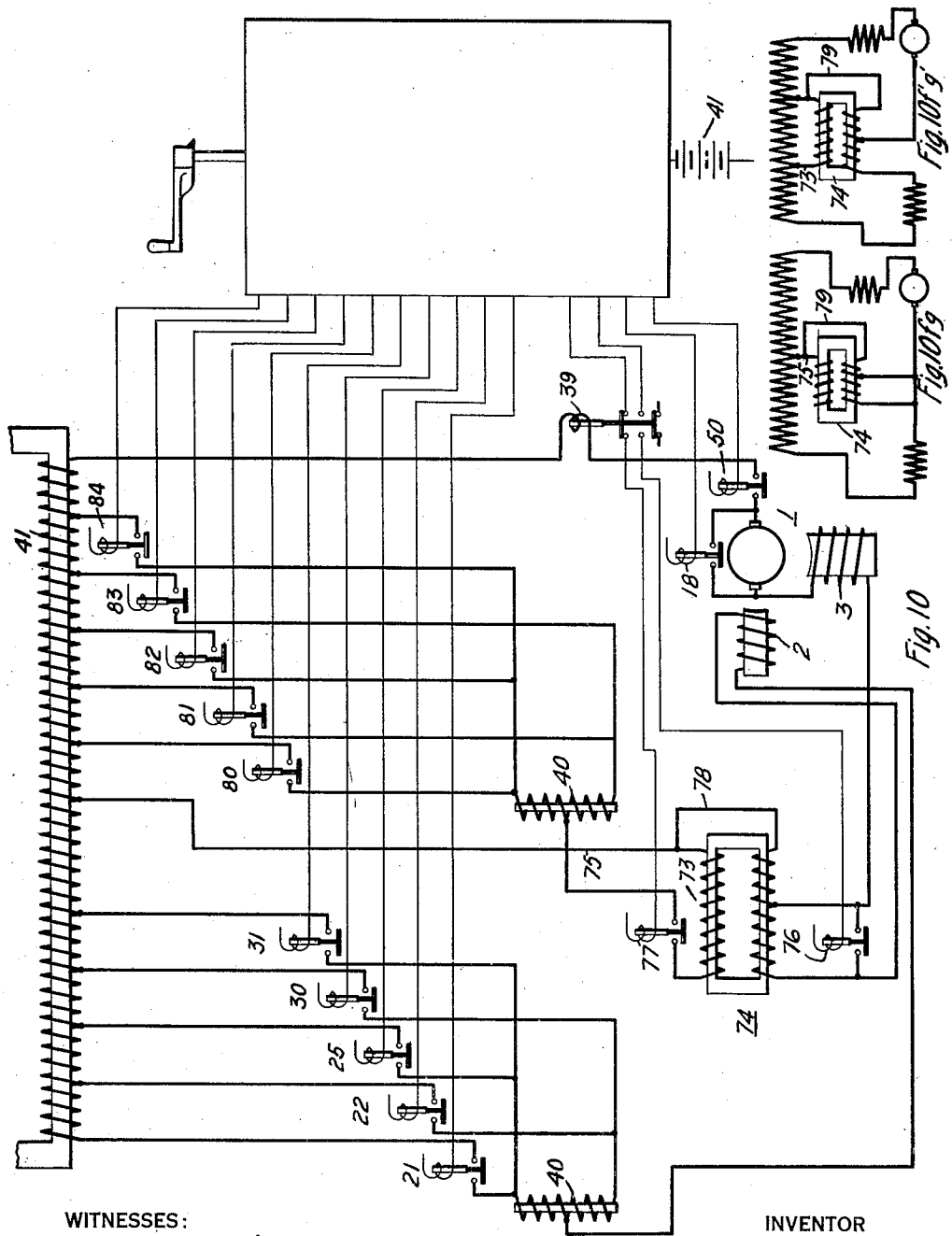

UNITED STATES PATENT OFFICE.

RUDOLF E. HELLMUND, OF SWISSVALE, PENNSYLVANIA, ASSIGNOR TO WESTINGHOUSE ELECTRIC & MANUFACTURING COMPANY, A CORPORATION OF PENNSYLVANIA.

SINGLE-PHASE MOTOR-CONTROL SYSTEM.

1,338,367. Specification of Letters Patent. Patented Apr. 27, 1920.

Application filed October 3, 1917. Serial No. 194,447.

*To all whom it may concern:*

Be it known that I, RUDOLF E. HELLMUND, a citizen of the German Empire, and a resident of Swissvale, in the county of Allegheny and State of Pennsylvania, have invented a new and useful Improvement in Single-Phase Motor-Control Systems, of which the following is a specification.

My invention relates to systems of speed and power-factor control for alternating-current commutator motors, and it has for its object to provide an improved system for adjusting the commutating conditions for dynamo-electric machines of the type under consideration and to obtain manual or automatic control of the speed and power factor which may be dependent upon the load applied to the motor.

A further object of my invention is to secure independent adjustments of the effective armature voltage and of the inducing field strength of motors embodying an inducing field winding and an armature winding having different numbers of turns.

A transformer-conduction connection for alternating-current motors of the compensated commutator type has heretofore been extensively employed in which the voltages applied to the armature and the inducing field-winding circuits were independently adjusted but in which the ratio of the load current flowing through the inducing winding and the armature winding circuits were determined by the ratio of turns in the respective windings. It has also been customary to provide the armature with substantially one-half as many turns as the inducing field winding, in which case, the armature current divides into two equal portions, one of which flows through the intermediate tap and the other of which flows through the inducing field winding to the source of current supply. The magnetizing current for the inducing field winding flows in quadrature with the portion of the armature current in the intermediate tap and the portion of armature current in the inducing winding and, since the magnitude of the compensating flux from the inducing field winding is dependent upon the voltage that is applied to this winding, the insertion of a winding which is inductive relative to the magnetizing current for the compensating field and non-inductive relative to the load current for this field, permits of the adjustment of the compensating field flux without affecting the load current or the effective armature voltage for the motor. It will thus be understood that, since the effective armature voltage is maintained constant, the inducing or compensating field flux may be varied to any desirable degree without affecting the motor speed or the load current for the motor.

According to my invention, I provide an inductive device which is included in the circuit for the inducing field winding and which is adapted to oppose the flow of magnetizing current but which is in non-inductive relation to the flow of motor-load current. In this manner, the magnetizing current, and, therefore, the inducing or compensating field flux, may be varied through a large range without changing the equivalent motor voltage and the load current in any appreciable degree. My invention furthermore contemplates the adjustment of this impedance device in order to regulate the flow of magnetizing current to the inducing winding in accordance with the motor-load current and speed.

Figure 1:
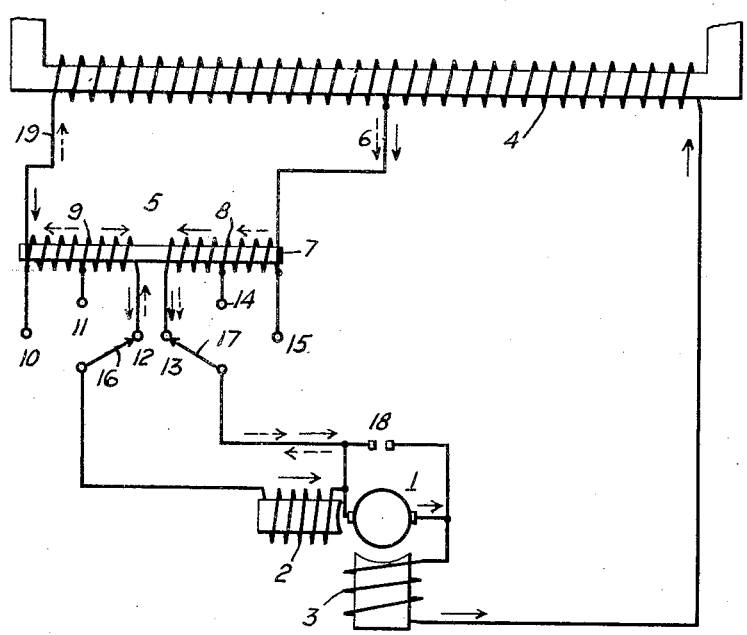

Figure 1 of the accompanying drawings is a diagrammatic view of a single-phase alternating-current motor having an inducing field winding and provided with auxiliary apparatus embodying a desirable form of my invention. Fig. 2 is a diagrammatic view illustrating a more complete system of control embodying my invention and Figs. 2*ab*, 2*c*, 2*d*, 2*e*, 2*f*, 2*gh*, 2*g'h'* and 2*g"h"* are schematic diagrams of the various connections established in Fig. 2. Fig. 3 is a diagrammatic view illustrating a modification of the system shown in Fig. 2. The circuit relations established for the most important steps in this system are illustrated in Figs. 3*f*, 3*ghi*, and 3*g'h'i'*. Fig. 4 is a diagrammatic view illustrating a further modification of my invention. Fig. 5 is a simplified diagrammatic view of a system of connections that are controlled in accordance with the motor current and which embody my invention. The remaining figures are diagrammatic views showing a single inducing device that is included in the intermediate motor tap to control the excitation of the inducing field winding in accordance with my invention.

Referring particularly to Fig. 1 of the drawings, a motor 1 is shown which is provided with a compensating or inducing field winding 2 and a magnetizing winding 3 and is adapted to be supplied with energy from a supply-circuit transformer 4 through an auxiliary inductive device 5. The motor 1 is here shown with transformer-conduction connections established for which separate voltages are applied to the armature and the inducing field-winding circuits by means of an intermediate tap 6.

The inductive device 5 comprises a magnetic core 7 and a plurality of coils 8 and 9 that are provided with taps 10 to 15, inclusive. The terminals of the inducing field winding 2 are adapted to be connected to the various taps by means of contact arms 16 and 17. The motor 1 is provided with a switch 18 for establishing a repulsion connection.

The motor shown in Fig. 1 is started into operation, as a repulsion motor, by moving the contact arm 16 into engagement with the tap 10, entirely disconnecting the contact arm 17 and closing the switch 18. Switching devices 10 and 18 are thus active, initially. The contact arm 17 is then moved into the illustrated connection with tap 13 and the switch 18 is next opened. The contact arm 17 is then successively shifted to taps 14 and 15. In this way, a transformer-conduction connection from the transformer lead 6 through the inductive coil 8 is established and, as the arm 17 is moved successively, to the other positions, a straight transformer-conduction motor connection, without impedance in the mid tap, is produced. The arms 16 and 17 are then successively moved into engagement with contact terminals 11 and 14 and 12 and 13, for a purpose to be hereinafter set forth.

Since the inducing winding 2 is preferably provided with substantially twice as many turns as the armature winding, one-half of the armature current will flow to the source through the coil 8 and the tap 6 and the remainder of the armature current will flow to the source through the inducing winding 2, the coil 9, and the tap 19, as indicated by the solid-line arrows shown in Fig. 1. The coils 8 and 9 are wound on the same magnetic core and, therefore, the magnetomotive force of each coil will be opposed by that of the other coil and no inductive opposition will be offered to the flow of load current through the inductive device 5. The magnetizing current for the inducing field winding 2 will, however, flow from the source through the tap 6, the coil 8, the inducing field winding 2, the coil 9 and the tap 19 to the source, as indicated by the dotted-line arrows. Thus, it will readily be understood that the magnetomotive forces produced by the flow of magnetizing current through the windings 8 and 9 will be in the same direction and, therefore, will oppose the flow of magnetizing current to the inducing winding 2. The flux from the inducing winding is dependent upon the voltage impressed across the winding and may be adjusted by changing the positions of the arms 16 and 17. It should also be noted that, for the initial transformer-conduction connection, the entire inductance of the coil 8 is inserted in the intermediate tap 6. This provides a very desirable approach to the full transformer-conduction connection.

Fig. 2 illustrates a much more complete system of connections in which a master controller 20, which is adapted to occupy a plurality of operative positions $a$ to $h$, inclusive, governs the operation of the switches 18 and 21 to 33, inclusive. The master controller 20 is provided with a main contact segment 35 and a plurality of auxiliary contact segments 36 and 37 that are adapted to be energized in accordance with the positions of the high and low-current-limit relays 38 and 39 which is determined by the current flowing through the motor armature. Energy is supplied to the motor 1 through a preventive coil 40, a portion of which is connected in the armature circuit, during operation, by means of the switch 18, as illustrated in Fig. 2ab. Coil 40 acts as an auto-transformer for supplying voltage to the armature winding.

The various steps in the operation of the system shown in Fig. 2 are illustrated in Figs. 2ab to Fig. 2gh, inclusive. For the initial operating position $a$ of the controller 20, switches 18, 21, 22 and 23 are energized from the controller segment 35 by the battery 41, which establishes the connections shown in Fig. 2ab. This is a special form of transformer-conduction connection, with a portion of the coil 9 in circuit with the inducing field circuit of the motor. The second controller position closes switch 24 and thereby cuts out the portion of the coil 9 from the circuit as shown by the dotted connection of Fig. 2ab. In the position $c$ of the controller, switch 25 is closed and switches 22 and 23 are opened to establish the connections shown in Fig. 2c; that is, a straight transformer induction connection. For the next controller position, switch 26 is closed, which establishes a connection through the tap 14, a portion of the coil 8 and the tap 6 to the main transformer 4, as shown in Fig. 2d. For position $e$, switch 18 is opened, thus removing the repulsion connection through the preventive coil 40 and providing the connections shown in Fig. 2e. On the following step $f$, the switch 27 is closed which connects the inductive device 5, as an auto-transformer, to reduce the voltage applied to the field winding 2. The controller is then advanced to the positions $g$ and $h$ for which the connections are controlled in accordance with the load that is applied to the motor. For heavy loads which draw large motor-currents and, therefore, maintain the relay in a raised position, the contact segments 36 and 37 are energized to close switches 23, 26, 28 and 29 and establish the connections shown in Fig. 2$gh$. It should be noted that, for this connection, the portions of the coils 8 and 9 are close-circuited which substantially connects the terminals of the field winding 2 directly to the transformer 4. When the current through the motor decreases to a medium value, the high-current relay 38 drops, thus deënergizing control segment 37 and opening switches 28 and 29, as shown in Fig. 2$g'h'$. If the motor current decreases to a sufficiently low value to permit the relay 39 to fall, control segment 36 will become deënergized and cause switches 23 and 26 to open, whereas segment 37 will again be energized to close switches 28 and 29, as shown in Fig. 2$g''h''$. It will thus be understood that the automatic operation of the relays 38 and 39 may be caused to effect the connections in the desired order, according to the motor current that flows through the armature circuit. The advancement of the controller beyond position $g$ merely closes the switch 30 to increase the voltage applied to the motor.

Fig. 3 illustrates a system of connections that is slightly modified from that shown in Fig. 2. The initial accelerating steps are similar to those described in connection with Fig. 2 and, since they are not essential to the invention, they will not be described in detail. Control apparatus which performs the same function in the various systems is similarly numbered. The transformer-conduction connection that is established when the controller is in position $f$ is shown in Fig. 3$f$ and is similar to that illustrated and described for Fig. 2$e$. Any subsequent movement of the controller from this position establishes the connections shown in either Fig. 3$gh$ or Fig. 3$g'h'$, in accordance with the load current flowing through the relay 39. Only a single current relay (39) is employed for this system of connections. When a large current is drawn by the motors, segment 36 will be energized and switches 25, 30, 43, 45 and 46 will be closed, thus establishing the connections shown in Fig. 3$gh$. A suitable accelerating relay 47 and a transition relay 48 may be employed with this system if desired. The motor connections illustrated in Fig. 3$gh$ establish a large inducing field flux by connecting the inducing field winding directly across the main transformer. When the load current decreases to a suitably small value, the relay 39 falls to its lowermost position and thereby opens switches 45 and 46 and closes switches 27 and 44 to provide the circuit relations shown in Fig. 3$g'h'$. The device 5 here operates as an auto-transformer to reduce the voltage applied to the field winding. Attention should be directed to the fact that the load current for the motor flows in opposite directions through the end portions of the device 5 and, therefore, sets up opposing magnetomotive forces in those windings, whereas, the exciting current for the inducing field winding 2 flows in the same direction through the portions of the winding 5 which offers inductive opposition to such flow of current.

Fig. 4 illustrates a slightly modified system of control for which the winding 9 remains in the main motor circuit for the connections established on positions $f$ and $g$ of the master controller when a large value of load current obtains. After the motor current has decreased to a predetermined small value, the relay 39 falls and establishes the connections shown in Fig. 4$f'g'$.

A system of control in which the inductive device 5 is employed for impressing a voltage upon the inducing field-winding that is larger than the main transformer voltage when the motor current exceeds a certain value, is shown in Fig. 5. When the motor current decreases sufficiently to permit the relay 39 to drop, a portion of the winding 9 is close-circuited, thus removing the effect of the device 5 from the motor circuit and substantially connecting the inducing field winding directly to the main transformer.

The remaining figures illustrate a single-coil device 61 which will perform the same function as the devices employed in the preceding figures but is connected in the intermediate tap and is not included in the outside terminal of the inducing field winding. The initial operating steps $a$ to $e$, inclusive, are similar to those already described. After the controller is moved to position $f$, the switches 21, 22, 50, and 53 are closed, and, when the motor current is great enough to raise the relay 39, switches 51 and 52 also are closed, thus establishing the connections shown in Fig. 6$fghi$. As soon as the current decreases to a value which permits the relay 39 to fall, switches 51 and 52 are opened and switch 54 is closed. It will readily be understood that, since the inductive device 61 comprises coils having substantially equal numbers of turns, the load current will flow through the device without encountering inductive opposition, whereas the magnetizing current for the winding 2 will have the total impedance of the coil 61 interposed in its circuit. This is substantially the same effect that is secured with the coils inserted in both inducing-field winding leads shown in the preceding figures.

Fig. 7 illustrates a system in which both terminals of the coil 61 are connected to the main transformer. This system provides independent circuits for the inducing field winding and for the armature winding. The device 61 merely decreases the applied armature voltage by a lesser amount than the inducing-field voltage is decreased, with the result that the effective armature voltage and, therefore, the motor speed, are maintained constant.

Fig. 8 illustrates a system of connections employing an inductive coil 61 having an intermediate tap 66 extending from the coil 61 to the armature circuit. By adjusting the position of this tap, the value of impedance that is inserted into the inducing field winding may be changed. Fig. 8$fg$ and Fig. 8$f'g'$ respectively show the final operating steps for large and small motor currents. It should further be pointed out that the device 61 can also be employed as a preventive coil for changing the voltage applied to the motor armature field winding. Switches 68 to 72, inclusive, are adapted to connect the device 61 to various transformer taps.

The coil 61 shown in Fig. 9 is adapted to be connected across a certain portion of the main transformer and thus to render that portion of the transformer ineffective without open-circuiting the motor circuit. An auxiliary switch 80 is provided for changing the amount of unused portion of the transformer. The series of interlocks "51—out, 53—out and 80—out" are supplied for preventing a short-circuit of the main transformer winding. The connections that are established for a large motor current are shown in Fig. 9$hi$ and those for a small current in Fig. 9$h'i'$.

Fig. 10 illustrates a further modification of the inductive device for changing the voltage impressed upon the inducing-field winding. One terminal of the primary coil 73 of the inductive device 74 is permanently connected to the main transformer winding 4 by means of a tap 75. The operation of the close-circuiting switch 76 and the connecting switch 77 for the primary coil 73 are controlled by the current relay 39 which establishes the connections shown in Fig. 10$fg$ for a large motor current and the connections shown in Fig. 10$f'g'$ for small values of current. The connections shown in Fig. 10$fg$ substantially constitute a direct connection from the main motor circuit through the close-circuited coil of the device 74 to the main transformer. Fig. 10$f'g'$ shows a connection that corresponds very closely to the relation established in the circuits shown and described in connection with Fig. 6$f'g'h'i'$. The primary coil 73 provides means for changing the voltage applied to the field winding without, in any manner, affecting the voltage applied to the motor armature. It will thus be understood that the adjustment of the voltage applied to the outer lead of the coil 73 by means of switches 80 to 84, inclusive, constitutes a very effective means for changing the voltage impressed upon the inducing winding 2 without substantially altering the voltage applied to the armature circuit, since the device 74 is non-inductive relative to the armature load current and, therefore, independent of the connection of the adjustable terminal of the coil 73.

Although I have illustrated and described my invention as applied to a system employing a transformer-conduction motor having substantially twice as many turns in the inducing field winding as in the armature winding, the invention is obviously not so limited but may be applied to systems employing motors having varying ratios of inducing to armature field turns. The alteration of the systems may be effected by merely altering the position of the intermediate transformer tap for the systems embodying a single inductive device included in the intermediate motor tap or by changing the ratio of the numbers of turns of the various windings of the inductive devices that are connected in both the intermediate tap and the external inducing field tap. I desire that only such limitations shall be imposed as are indicated in the appended claims.

I claim is my invention:

1. The combination with a doubly-fed motor, of a source of alternating-current, inner and outer inducing-field leads from said source to said motor, and inductively related windings inserted in said leads, said windings being so connected that the magnetomotive forces thereof, due to the flow of load current therethrough, are in opposition.

2. The combination with a doubly-fed motor provided with "$n$" times as many inducing-field turns as armature turns, of a source of alternating current, inner and outer inducing field supply leads from said source to said motor, and inductively related windings inserted in said supply leads, the number of turns in the winding inserted in the outer inducing field lead having ($n$—1) times the number of turns in the winding inserted in the inner inducing-field lead, said windings being connected so that their magnetomotive forces are mutually opposed.

3. The combination with a doubly-fed motor provided with substantially twice as many inducing-field turns as armature turns, of a source of alternating-current inner and outer inducing-field supply leads from said source to said motor, and inductively related windings having substantially equal numbers of turns inserted in said supply leads, said windings being connected so that their magnetomotive forces are mutually opposed.

4. The combination with an alternating-current commutator motor provided with $n$ times as many turns in the inducing-field winding as in the armature winding and having supply leads at each terminal of the inducing-field winding, of inductively related windings in said supply leads, the winding in the outer supply lead having $(n-1)$ times as many turns as that in the inner supply lead, the magnetomotive forces of said windings, due to the flow of load current therethrough, being in opposition.

5. The combination with the inducing-field winding of a doubly-fed motor, of current-controlling apparatus connected thereto, said apparatus being substantially non-inductive to the load current of said motor but being inductive with respect to the magnetizing current of said inducing-field winding.

6. The combination with the inducing-field winding of a doubly-fed motor, of current-controlling apparatus connected thereto, said apparatus being substantially non-inductive to the load current of said motor but being inductive with respect to the magnetizing current of said inducing-field winding, and means for varying the inductive effect of said apparatus with respect to said magnetizing current.

7. The combination with a transformer-conduction motor having an inducing field winding, of an auxiliary transformer having a plurality of mutually inductive windings, one of said transformer windings being connected in series with said inducing field winding and another of said transformer windings being connected in the mid tap of said transformer-conduction motor, and circuit connections whereby the magnetizing currents of said auxiliary transformer and of said inducing field winding are substantially equal.

8. The combination with a transformer-conduction motor having an inducing field winding, of a main circuit transformer and an auxiliary transformer having a plurality of mutually-inductive coils, one terminal of each of said coils being connected to said main transformer, each terminal of said inducing field winding being adjustably connected to one of said coils.

9. The combination with a transformer-conduction motor having an armature and an inducing field winding, of a main supply transformer, an auxiliary transformer having a coil connected in the mid tap for said motor, and switching devices connected to said auxiliary transformer for decreasing the voltage derived from the main transformer and applied to said inducing field winding and simultaneously increasing the armature voltage by a less amount.

In testimony whereof I have hereunto subscribed my name this 14th day of Sept., 1917.

RUDOLF E. HELLMUND.